United States Patent [19]

Arthur

[11] 4,010,614
[45] Mar. 8, 1977

[54] SOLAR RADIATION COLLECTOR AND SYSTEM FOR CONVERTING AND STORING COLLECTED SOLAR ENERGY

[76] Inventor: David M. Arthur, 4020 N. 14th Ave., Phoenix, Ariz. 85013

[22] Filed: Nov. 13, 1974

[21] Appl. No.: 523,262

[52] U.S. Cl. .............................. 60/641; 126/270; 60/398

[51] Int. Cl.² ..................................... F03Q 7/02

[58] Field of Search ............ 60/398, 641; 126/270, 126/271

[56] References Cited

UNITED STATES PATENTS

| | | | |
|---|---|---|---|
| 820,127 | 5/1906 | Pope | 126/271 |
| 1,217,165 | 2/1917 | Fessenden | 60/641 |
| 1,424,932 | 8/1922 | Moreau | 126/270 |
| 3,310,102 | 3/1967 | Trombee | 126/270 X |

FOREIGN PATENTS OR APPLICATIONS

| | | | |
|---|---|---|---|
| 511,568 | 12/1920 | France | 126/270 |
| 865,725 | 5/1941 | France | 60/641 |
| 1,287,760 | 2/1962 | France | 126/270 |
| 386,264 | 12/1923 | Germany | 126/270 |
| 375,685 | 6/1932 | United Kingdom | 126/270 |

*Primary Examiner*—Martin P. Schwadron
*Assistant Examiner*—Harold Burks, Sr.
*Attorney, Agent, or Firm*—Cahill, Sutton & Thomas

[57] ABSTRACT

A system is disclosed for converting solar radiation into electricity and for storing energy generated in excess of demand. The system includes a large circular collector fabricated from modular elements. The collector is combined with a concentrator and boiler for producing steam. The steam produced is used to drive an electrical generator and a hydraulic pump. When system demand is less than the capacity of the generator, the excess energy is used to drive the pump. The pump transports water from a low level reservoir to an elevated reservoir, thereby storing potential energy. Later, when demand increases, water from the elevated reservoir is used to drive a second electrical generator. The circular collector is mounted on tracking apparatus which automatically aims the collector to focus on the sun and receive maximum solar radiation on its surface.

4 Claims, 12 Drawing Figures

SOLAR RADIATION COLLECTOR AND SYSTEM FOR CONVERTING AND STORING COLLECTED SOLAR ENERGY

BACKGROUND OF THE INVENTION

Although it has long been known that the sun is a virtually inexhaustible energy source, very little serious effort has been applied to practically utilizing solar energy. Recently, however, as fossil fuel sources have proven to be inadequate to meet present demands for energy, more attention has been given to the problem of depleting the supply of fossil fuel within the foreseeable future. It has become apparent that alternative energy sources must be developed.

Substantial effort has been made in the field of energy production using nuclear energy sources. However, the quantity of nuclear material is also limited and many experts consider nuclear energy a stop-gap solution at best. Conversion of solar radiation into usable energy appears to be an ultimate solution to our long-term energy requirements.

Not only is solar energy virtually inexhaustible, it is clean and produces no polluting wastes or by-products. Even in geographical areas where cloud cover makes solar energy conversion ineffective, electricity which was produced elsewhere by solar energy conversion could be utilized.

The earliest attempts to utilize solar radiation were directed to apparatus for raising water for irrigation purposes. Such a system was described in 1890 in U.S. Pat. No. 433,055 issued to C. Tellier. The patents of Aubrey G. Eneas were obtained in 1900 and described a solar powered steam engine "especially intended for use in connection with irrigation of the grid plains of the West."

Until the advent of electricity, such energy producing systems were relatively inflexible. They were effective only during sunlight hours and only to produce work in the vicinity of the solar conversion apparatus. Conversion of solar radiation into electricity permitted the converted energy to be transported and stored. In 1921, W. J. Harvey disclosed a refinement in U.S. Pat. No. 1,386,781 for tracking the sun to permit utilization of the maximum available energy during sunlight hours. Since this system utilized a clockwork mechanism, it was necessary to periodically adjust and verify the tracking course to compensate for the progression of the sun's track across the sky throughout an annual cycle.

The problem of balancing a constant energy generating system against a variable energy demand was attached by A. Weipel. In his 1965 U.S. Pat. No. 3,214,915, he disclosed a system in which a constant output hydroelectric generator is used in a variable demand arrangement. During peak demand periods, all electricity produced by the generator is applied to a customer distribution network. When customer demand goes down, the excess electricity is used to power a hydraulic pump which raises water from a low-lying reservoir to a reservoir at an elevated location. Later, the potential energy thus stored is recovered by the action of water from the elevated reservoir in powering the hydroelectric generator.

However, no system is perfectly efficient and it is always necessary to compensate for losses in the system. If the Weipel system is placed where there is significant rainfall, the natural runoff could provide such compensation if it were collected in the elevated reservoir. However, in sunny, arid regions the compensating effect of rainfall is minimized. In fact, because of increased evaporation in arid regions, such a system would have increased losses in such a setting.

Prior systems for collecting and concentrating solar radiation have been of two general configurations, planar and deep-dish. The planar collectors have been inefficient because of the relatively large reflective losses produced by radiation reflecting away from their surface. Deep-dish configurations have been effective in minimizing reflective losses, and in concentrating collected radition. However, the intricate shape, such as parabolic surfaces, makes such deep-dish collectors expensive to fabricate. For example, the United States Army's 80-foot diameter collector at White Sands, New Mexico, cost almost a million dollars and a larger one fabricated by the French in 1970 cost twice that much.

Systems for directly converting solar energy into electricity are not new; but they are very expensive. Solar cells produce electricity at a cost that is prohibitive, up to one hundred times the cost of electricity produced by a coal-fired generating plant.

It is therefore an object of my invention to produce electricity converted from solar energy at a low, competitive cost.

It is also an object of my invention to produce an electrical generating system having a generating capability unrelated to demand with storage capacity for energy generated in excess of demand.

It is a further object of my invention to produce an energy storage system using solar radiation as principal energy input and compensation for loss and operational inefficiency.

Yet another object of my invention is to produce a solar radiation conversion system that will automatically track the sun so that the maximum solar effect may be realized at all times.

Still another object of my invention is to produce a solar radiation collector having a simple, economically produced and highly efficient configuration.

SUMMARY OF THE INVENTION

In an illustrative embodiment of my invention, a circular collector for solar radiation is fabricated from a plurality of modular elements to form a reflective surface. Apparatus is provided to automatically track the position of the sun and to aim the collector to receive maximum radiation on its surface. A concentrator automatically focuses the collected radiation onto the surface of a boiler. The boiler produces steam which powers a hydraulic pump and an electrical generator. When the demand for electricity is less than the generating capacity, the excess energy powers the pump to move water from a low-level reservoir to an elevated reservoir. Water from the elevated reservoir is used to drive another electrical generator as necessary to meet demand.

DETAILED DESCRIPTION OF AN ILLUSTRATIVE EMBODIMENT

Figure 1:
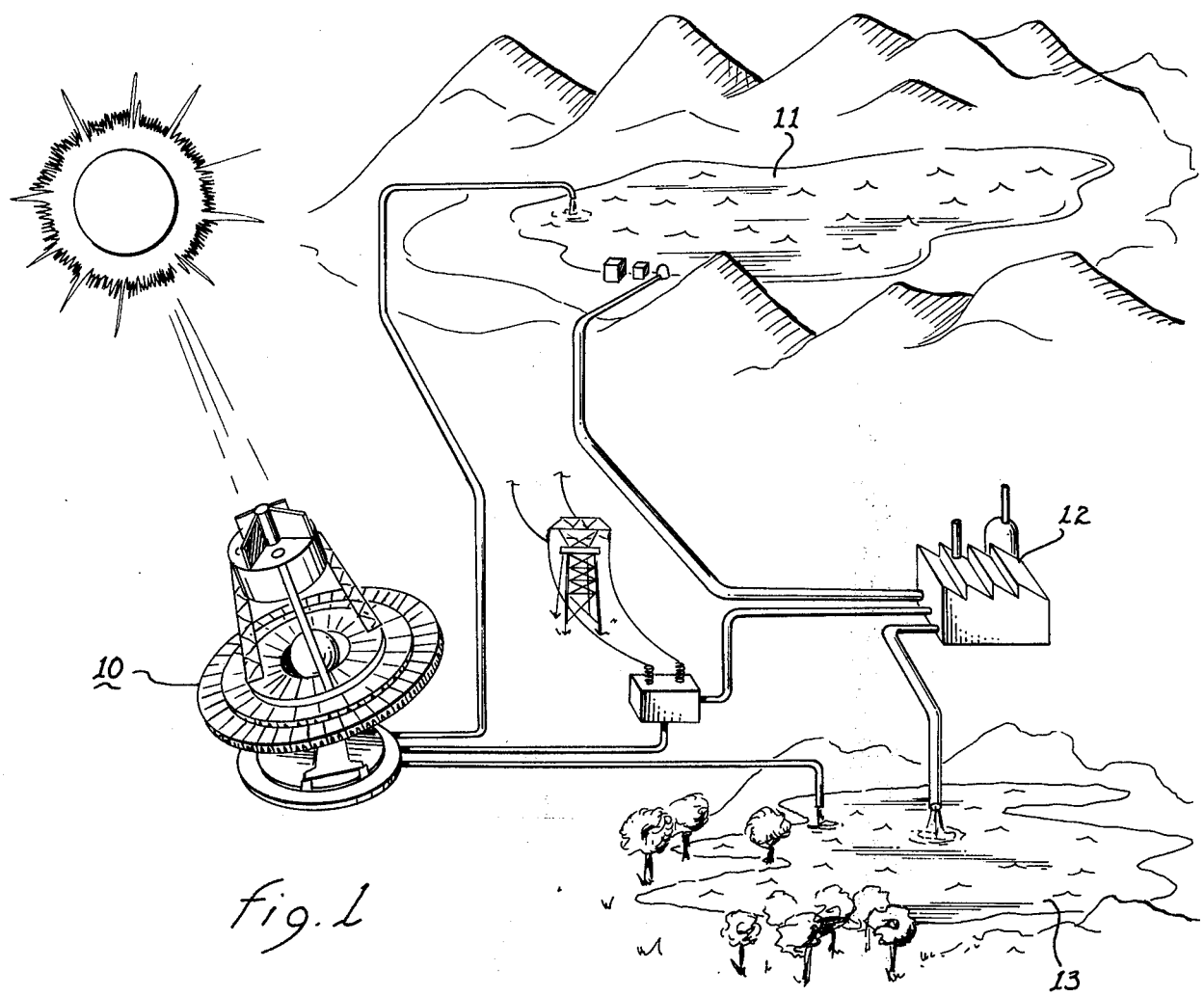
FIG. 1 is a perspective view of a system embodying my invention, shown in its natural environment.

A typical system in accordance with my invention is depicted in FIG. 1 of the drawing. A solar energy conversion tower 10 is placed to collect and concentrate solar radiation and convert the latent heat thereof into usable energy. A portion of the energy is converted directly into electricity to supply customers served by the system. The balance of the energy is stored, to be used to produce electricity when customer demands increase. The energy is stored by pumping water into an elevated reservoir or lake 11 from a lower reservoir or lake 13. At a later time, the potential energy represented by the water in reservoir 11 may be utilized to produce electricity by allowing water in reservoir 11 to power a hydroelectric generator 12 and be discharged into reservoir 13.

Only a single conversion tower 10 has been depicted. However, it will be clearly understood that any number of such towers could be operated in parallel. The physical size limitations on tower 10 are unrelated to any demand for electricity. Rather than increasing the size of tower 10 indefinitely to produce systems of ever increasing generating capacity, the towers are designed for optimum physical size and then merely duplicated to increase generating capacity for the system. This is particularly advantageous where the community utilizing the system is growing and the demand for electricity increasing. Rather than being necessary to replace a conversion tower with a physically larger tower to meet increasing demands, additional towers may merely be added to increase the system capacity.

The electrical outputs of the towers may be combined using a conventional electrical distribution network (not shown). The storage capacity of each tower is connected in parallel either physically, by having each tower connect to the water conduits to and from the reservoir, or functionally by having their water inlets connected to reservoir 13 and their water outlets discharging into reservoir 11.

For reasons of economy, the generating station 12 would not normally be duplicated. Station 12 may be strategically located relative to upper reservoir 11 or lower reservoir 13, and be expanded to provide increasing capacity as needed. It would, however, be possible to provide multiple hydroelectric generators 12 to meet special needs.

Figure 2:
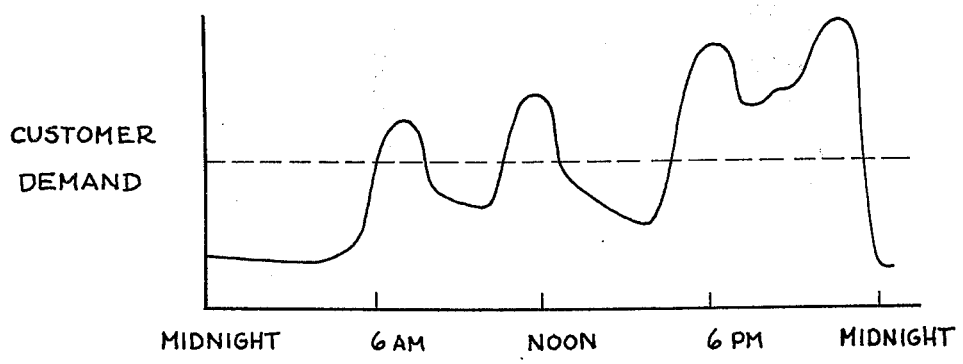
FIG. 2 is a graphical representation of consumer electricity demand throughout the hours of a day.

The necessity for providing storage capacity is immediately apparent from a study of the varying consumer demand shown graphically in FIG. 2. There is a minimum system demand residual requirement, occurring generally during the late evening and early morning hours. During the mid-morning hours, the demand increases as the system's customers awaken and commercial or industrial needs increase. Demand tapers off somewhat until the noon hour approaches when demand peaks again. Following the noon hour, demand again tapers off, only to increase again at the dinner hour. Following the dinner hour, demand tapers off again until the demand for hot water at bedtime causes demand to increase again, producing another peak. FIG. 2 represents a typical day, but it should be recognized that variations occur for work days and weekends and for variations in demand in response to weather and temperature changes throughout the year.

Obviously, a system having a capacity sufficient only to meet the residual demand would be unsatisfactory. On the other hand, a system having a capacity sufficient to meet the maximum peak demand would be both unnecessary and uneconomical. The design demand for such a system is the averaged demand depicted by the dashed line in FIG. 2. If the dashed line in FIG. 2 represents the maximum electrical generating capacity of tower 10, and the solid line represents the electricity needs of the system's customers, the system would function as follows. Whenever generating capacity exceeds demand (at 10 A.M., for example), the excess generating capacity is utilized to raise water from lower reservoir 13 to the elevated reservoir 11. Once demand exceeds the generating capacity of the tower 10 (at noon, for example), the potential energy stored earlier in the day is utilized by taking water from reservoir 11, using it to power the hydroelectric generator 12 and produce the additional electricity needed, and then discharging the water into reservoir 13.

Since reservoir 11 could be located to collect natural runoff of rainwater from higher elevations, an additional energy source would be utilized. Reservoir 11 could be a naturally occurring lake, or a man-made lake created by damming such as those found throughout the Southwestern United States. Any rainfall accumulation in reservoir 11 would further compensate for losses or inefficiencies of the system, due for example to evaporation from the reservoirs. In addition, since the conversion tower 10 is ideally placed where there is strong, continuous sunlight uninterrupted by cloudcover, the surrounding atmosphere may be arid or semi-arid, making loss due to evaporation a significant efficiency factor.

An additional advantage in providing energy storage capacity is inherent in the solar energy converter. Beyond the obvious fact that such a system can generate electricity only during sunlight hours while demand continues throughout the nighttime as well, such a system is basically inflexible. A natural variation in the intensity of the solar radiation occurs from a low at sunrise to a maximum at solar noon and back to a minimum at sunset. Therefore, it can be seen that the variation in generating capacity is unrelated to variations in demand. But more significant, the generating capacity of a solar radiation collector is essentially constant during sunlight hours. There is no way to speed it up, or slow it down to adjust to varying demands. The size of the radiation collecting apparatus is fixed. The only way that the amount of energy collected could be decreased below the system's capacity would be to dissipate (waste) a portion of the energy received from the sun.

Other types of generators, such as oil-fired, coal-burning or hydroelectric generators, can be operated at variable capacity because the energy input can be regulated. The speed of the powering engine can be varied, or the quantity of water released to power the generator may be regulated. But a solar generator is powered by an unregulated energy source. Solar radiation is received at the earth's surface with its intensity depending only on atmospheric conditions. Whether that energy is utilized or not, the available energy is unchanged. The sun is, in effect, a constant value energy source. There is no way to regulate the energy producing value of the source, therefore the most efficient system must utilize all the available energy regardless of the demand on the system. Thus, the importance of the energy storage capacity of the system pertains not only to around-the-clock capacity, but also to the operational efficiency of utilizing all the energy available.

It has not been specifically mentioned, but it should be apparent, that the energy storage capability is also valuable to compensate for weather variations. An electricity producing system that is wholly effective only on clear, sunny days would be completely unsatisfactory. Therefore, even in areas where cloud cover is unusual, it would be necessary to provide a capability for providing electricity in the absence of sunlight.

Figure 3:
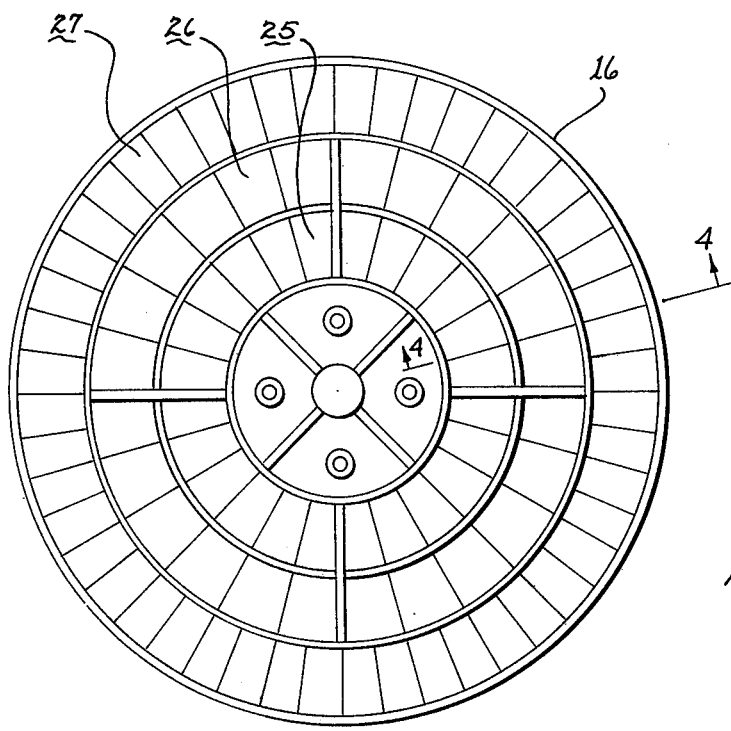
FIG. 3 is a plan view of a solar radiation collector in accordance with my invention.

At the heart of the conversion tower 10 is a circular collector 16 as shown in FIG. 3. Collector 16 gathers the solar radiation and reflects the radiation to a focal area where it can be concentrated. As FIG. 3 shows, collector 16 is fabricated from a number of individual reflective areas. The assembly of collector 16 is best understood in conjunction with FIG. 4, which is a partial cross-section taken along a radial line.

Figure 4:
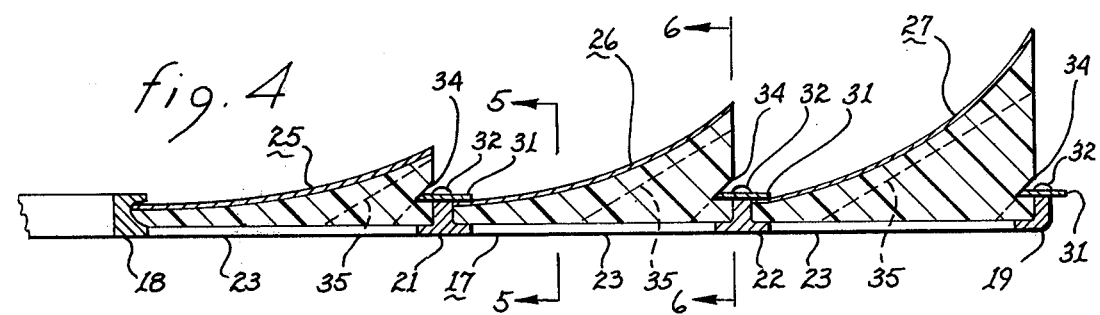
FIG. 4 is a partial cross-sectional view of the collector shown in FIG. 3.
Figure 5:
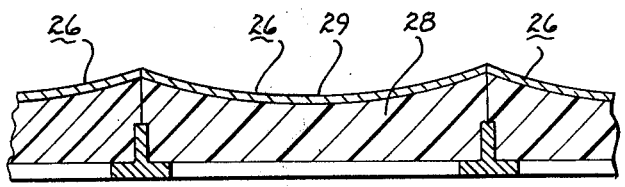
FIG. 5 is a partial cross-sectional view taken along the line shown in FIG. 4.

As FIG. 4 shows, collector 16 is assembled on a framework 17 having a planar rear or bottom surface. Frame 17 includes an inner rim 18 fabricated from channel stock. Rim 18 is circular in plan and represents the inner extension of collector 16. FIG. 5 is a cross-sectional view taken across FIG. 4, as shown, and depicts the configuration through the radial portion of framework 17 and through the numerous reflective areas. Extending radially outward, and terminating in an outer rim 19, are a number of radial T's 23. Forming intermediate rings between inner rim 18 and outer rim 19 are two T-shaped rings, inner T support 21 and outer T support 22. Outer rim 19 is fabricated from L-shaped stock.

Framework 17 consists of inner rim 18, inner T support 21, outer T support 22, outer rim 19 and the radial T's 23. Framework 17 connects to form a plurality of annular rings separated into annular segments. Each segment within an annulus is identical to the other segments within that annulus. For example, each segment of the inner annulus comprising collector 16 is an identical inner pannel 25. Each segment of the middle annulus comprising collector 16 is an identical center panel 26. And each segment of the outer annulus comprising collector 16 is an identical outer panel 27.

Collector 16 is assembled as follows. After framework 17 is fabricated, the inner lip of an inner panel 25 is inserted into the open side of inner rim 18. Each panel 25 is then dropped into place where it is supported by the inside flange of inner T support 21 and by the flanges of radial T's 23. Panel 25 is then locked in position and secured to framework 17 by a locking bar 31 which fastens to inner T support 21 with screws 32. Bar 31 fits into a locking notch 34 which is common to each of the inner, center and outer panels 25, 26 and 27, respectively.

As FIG. 4 clearly shows, locking bar 31 creates a channel shape when it is fastened to inner T support 21. The center annulus is then assembled by inserting the inner lip of center panels 26 into the channel provided by T support 21 and locking bar 31. Similar to panels 25, the panels 26 are supported, when properly positioned, by radial T's 23 and the inner flange of outer T support 22. Panels 26 are then fastened to framework 17 by inserting a locking bar 31 into the locking notch 31 and securing the bar to T support 22 with screws 32.

The panels 27 are similarly assembled. The inner lip of the outer panels 27 is inserted into the channel formed by outer T support 22 and locking bar 31. Panel 27 is then supported by radial T's 23 and the inner flange of outside rim 19. Once positioned, panel 27 is locked in place by inserting locking bar 31 into the locking notch 34 and securing it to rim 19 with screws 32.

The individual elements that make up framework 17 could be economically fabricated from extruded metal, such as aluminum, and either welded or screwed together. Although inner rim 18, outer rim 19, inner T support 21 and outer T support 22 were described as ring shaped or circular, it should be borne in mind that that is not a necessity. These elements could be readily fabricated from lengths of straight stock. The resultant shape would approximate a circular configuration but would in fact be a many sided polygon, a 48-sided figure for example.

Examination of FIGS. 4 and 5 also reveals that although the rear surface of panels 25, 26 and 27 is flat, the forward or upper surface is concave. Because the radius of each annulus is different, the radius of curvature of panels 25, 26 and 27 will vary. This permits the radiation reflected by the surface of the panels to be focused at a single central focal area. FIG. 5 particularly shows the radius of curvature of panel 26 in a direction across the radial direction of collector 16. Panel 26, which is typical of panels 25 and 27, includes a molded plastic foam core 28 and a reflective surface 29. Core 28 is molded to the desired configuration, including the composite curve of the top surface. To provide the reflective properties desired on the top surface of the panel, a reflective surface is added to the surface of the molded core.

The reflective surface 29 could be fabricated in a number of ways. For example, a metallized layer could be sprayed onto core 28. However, the most economical fabrication technique is simply to secure a thin layer of aluminum sheet to core 28 with adhesive. This may be done either as a separate step following the molding of core 28, or it may be incorporated directly into the molding operation.

Figure 6:
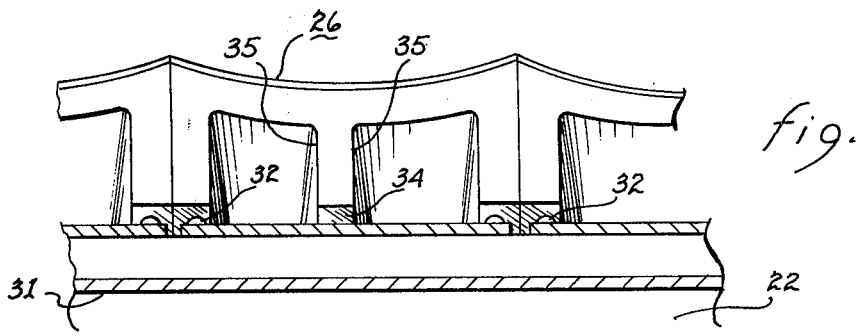
FIG. 6 is a partial cross-sectional view taken along the line shown in FIG. 4.

Referring now to FIG. 6, another feature of the individual panels can be seen. Once again, panel 26 is depicted, but it is typical as well of panels 25 and 27. In order to reduce effects of wind pressure on the extensive surface of collector 16, and thereby reduce the required strength of framework 17 and panels 25, 26 and 27, the panels are provided with wind pressure relief slots 35. Slots 35 are molded directly into core 28 (as is the locking notch 34 previously discussed). Because slots 35 extend completely through core 28, air pressure buildup is minimized since the rear of collector 17 is now connected to the front surface of the collector and any pressure buildup due to wind is prevented. Since the slots 35 serve to equalize pressure on the front and rear surfaces of collector 16, it makes no difference whether the wind is flowing from the front or from the rear.

Because each panel within an annulus is identically shaped, and since each panel is individually secured as described, repairs to the surface of collector 16 can be readily made by replacing a panel. In addition to the possibility of damage due to gusty wind, individual panels could be broken by foreign objects, whether those objects are vandal's stones, birds or hailstones. Not only are broken panels easily replaceable, any panel that loses its reflective efficiency due to dirt, deformation or deterioration of the reflective material could be readily replaced, either permanently or temporarily to permit cleaning, etc.

Figure 7:
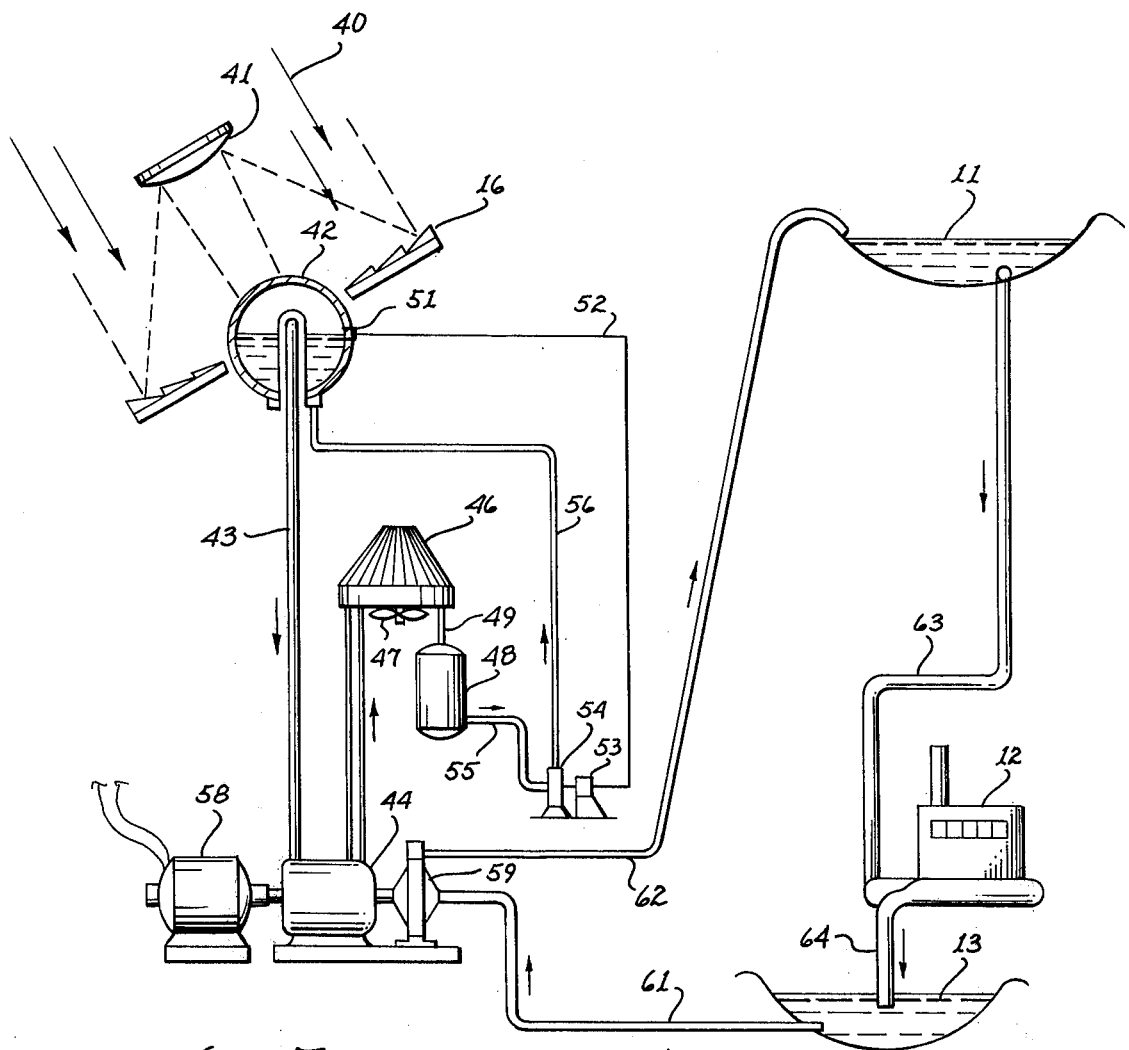
FIG. 7 is a functional schematic of the system shown in FIG. 1.

The system depicted in FIG. 1 is shown functionally in FIG. 7. Incoming solar radiation 40 is reflected by the upper surface of collector 16. The reflected radiation focuses on a concentrator 41 positioned on the central axis of collector 16. Concentrator 41 focuses the concentrated radiation on the surface of a spherical boiler 42 by reflection from its reflective convex shape. Boiler 42 is heated by the latent heat in the concentrated radiation. The water in boiler 42 is converted into steam that is delivered through a conduit 43 to a steam turbine 44. A discharge line 45 moves the spent steam out of turbine 44 and through the coils of an air-cooled condensing unit 46. The condensing unit 46 is cooled by air from a circulation fan 47 to convert spent steam back into water by removing the heat of vaporization. The condensed water is delivered to a return reservoir 48 via a pipe 49 where the condensate is stored until it is needed to replace water in boiler 42.

A limit switch 51 in boiler 42 detects a low water condition. Switch 51 connects through wire 52 to an electric motor 53. When switch 51 detects the low water condition in boiler 42, motor 53 turns on to drive a water pump 54. Pump 54 takes water from pipe 55, which connects to the condensate reservoir 48 and pumps it through return line 56 to boiler 42. When the water level is raised to its proper level in boiler 42, motor 53 turns off.

The power shaft of turbine 44 connects, through clutches which are not shown but which are well known in the art, to electrical generator 58 and to hydraulic pump 50. As described earlier, turbine 44 provides rotating power to drive generator 58 so long as the customer demand requires full capacity from the generator. As demand decreases and becomes less than the capacity of generator 58, pump 59 utilizes the available energy to pump water from the low reservoir 13 via pickup pipe 61 and into the elevated reservoir 11 via a pump outlet pipe 62.

It should be apparent that boiler 42 and its related apparatus is merely illustrative of means for converting the heat of concentrated solar radiation into usable energy. Boiler 42 could be replaced by other energy converting devices, such as chemical converters, without affecting the operation of the system. The alterations required to accommodate alternative means for utilizing the heat of the concentrated radiation would be apparent to those skilled in the art and no attempt will be made to describe all feasible variations.

As the customer demand exceeds the generating capacity of generator 58, or during non-sunlight periods, water from reservoir 11 flows into plant inlet pipe 63 for delivery to hydroelectric generator 12. Generator 12 uses the incoming water as a power source to generate the power required to meet the system demands. Water is then discharged into reservoir 13 via discharge line 64.

Figure 8:
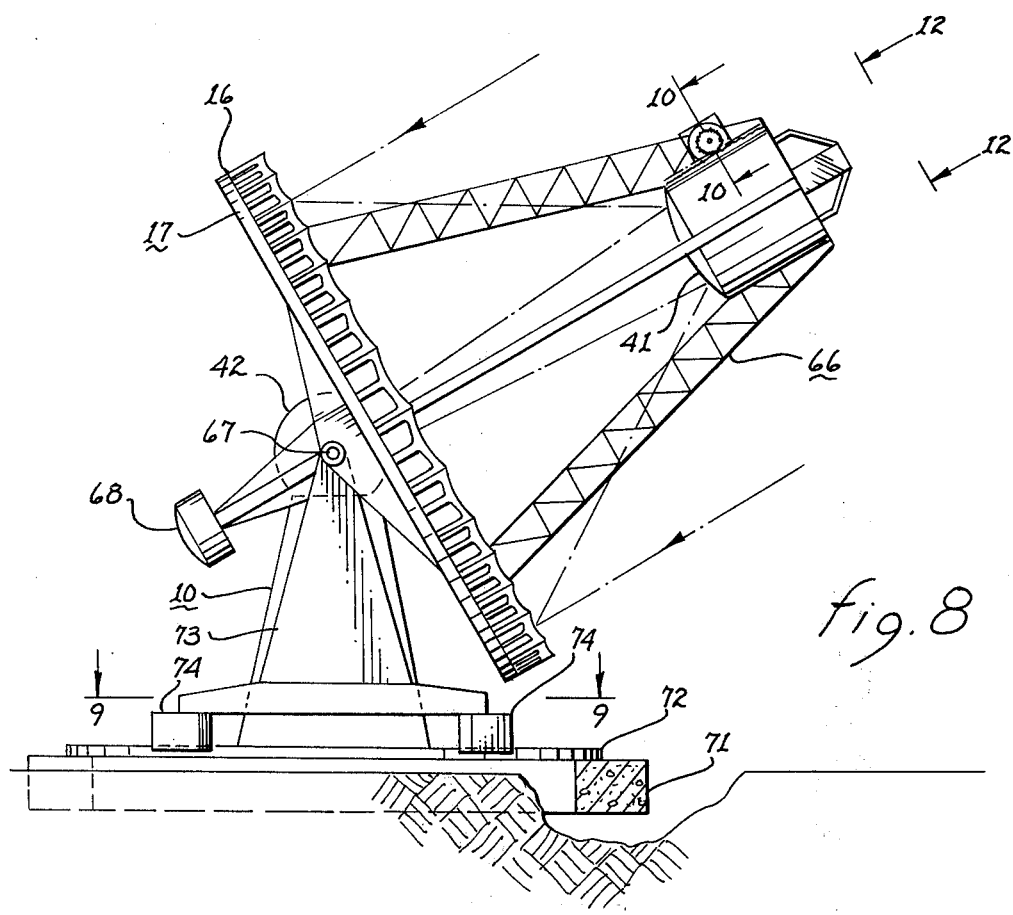
FIG. 8 is an elevation view of the collector shown in FIG. 3.

Because the sun is a moving energy source, and because collector 16 is most effective when solar radiation is received at a direction parallel to the central axis, it is beneficial to have collector 16 mounted in such a way that it can be moved to follow the sun's path across the daytime sky. Collector 16, and the mounting tower 66 including concentrator 41, are mounted to rotate about a pivot 67 located approximately concentric to boiler 42. As seen in FIG. 8, collector 16 can be oriented at almost any angle. This permits collector 16 to track the elevation of the sun. To facilitate movement of the large mass represented by collector 16 and mounting tower 66, a counterweight 68 is provided on the opposite side of pivot 67.

Figure 9:
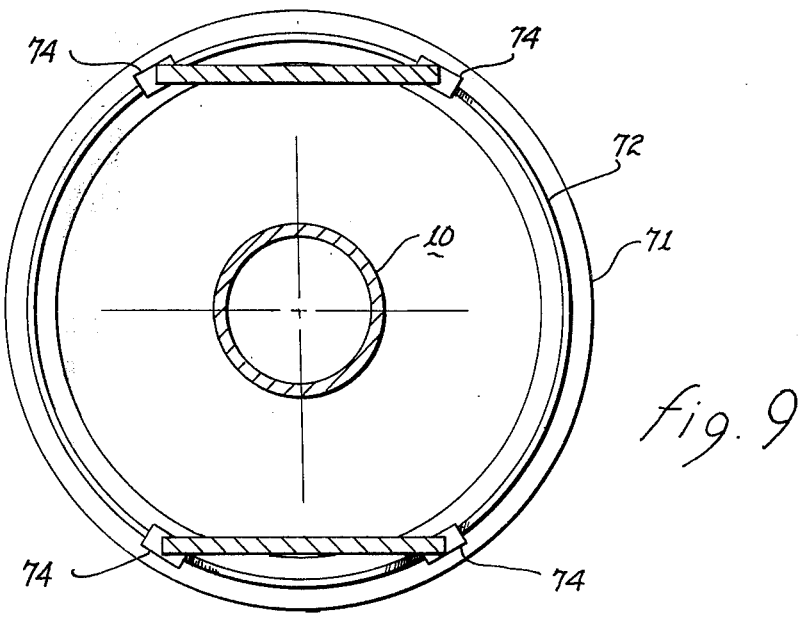
FIG. 9 is a cross-sectional view of the collector taken along the line shown in FIG. 8.

The pivot 67 is connected to upright support 73 which carries the vertical load of collector 16 and mounting tower 66. In order to track the varying azimuth position of the sun, upright support 73 is mounted to rotate. As can be seen in conjunction with FIG. 9, support 73 may be rotated about conversion tower 10 by movement of supporting roller carriage 74 along a circular rail 72 mounted on a supporting base 71. Rail 72 is A.S.C.E. track supported on a poured concrete ring foundation forming base 71.

As will be explained later in more detail, the synchronous gear drive motors which comprise carriage 74 are operated to properly orient support 73 on rail 72. The collector 16 and tower 66 assembly is then rotated around pivot 67 to aim the assembly directly at the sun.

Figures 10, 11:
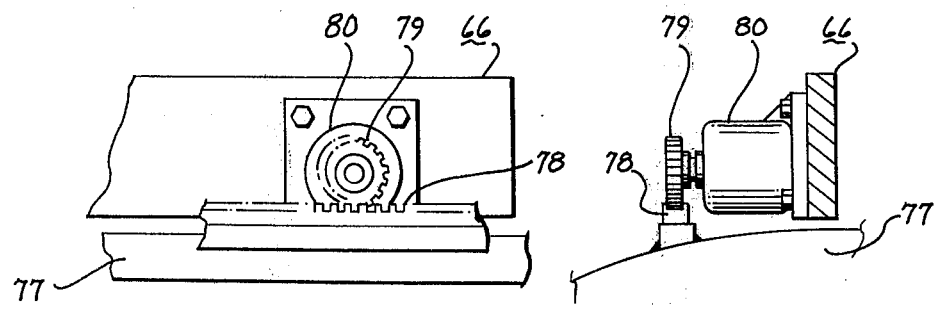
FIG. 10 is an enlarged detail view showing the plan view of a portion of the collector taken along the line shown in FIG. 8.
FIG. 11 is an elevation view of the apparatus of FIG. 10.

To further insure that maximum available energy is being utilized, concentrator 41 is mounted on tower 66 in such a way that it may be selectively positioned along the central axis of collector 16 to insure that the concentrated radiation is properly focused on boiler 42. As shown in FIGS. 10 and 11, concentrator 41 and an automatic tracking assembly 77 (which will be explained later in detail) are mounted so that a rack gear 78, which connects to the concentrator and tracking assembly mechanism, engages a pinion drive gear 79 connected to the shaft of a control motor 80. Motor 80 connects to the mounting tower 66. When it is desired to reposition concentrator 41 to refocus the concentrated radiation, motor 80 is operated to rotate gear 79. The advancement of gear 79 along rack gear 78 causes the entire assemblage including concentrator 41 to move relative to tower 66.

Figure 12:
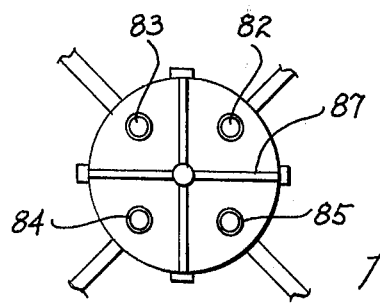
FIG. 12 is a partial plan view taken along the line shown in FIG. 8.

Although it was described earlier how collector 16 could be moved to track the sun across the sky, no method of accomplishing this was described. Obviously, the tracking apparatus could be operator controlled. But more practical is the use of a stored program tracking system. The programming of such a tracking system is well known and is used to track terrestial targets for astronomical telescopes. Another form of automatic tracking apparatus is depicted in FIG. 12. This apparatus could be used as a substitute for, or to augment, a programmed tracking system.

The system of automatic tracking shown in FIG. 12 comprises four photo-electric cells 82, 83, 84 and 85 which are isolated from each other by a light baffle 87.

If the light received on cells 82 and 84 is unequal, the apparatus is not aimed directly at the sun. The inequality would be used to produce an electrical signal causing the drive motors of carriages 74 to operate. As soon as the apparatus is positioned along the sun's azimuth, the light received by cells 82 and 84 will be equal and the drive motors of carriage 74 will be turned off. If the light received by cells 83 and 85 is now unequal, the elevation of the apparatus will be changed by rotation about pivot 67. When the light received by cells 83 and 85 is equal, the elevation will be equal to that of the sun and the apparatus will be properly aimed.

The automatic tracking apparatus just described can be used to continuously track the solar position or it can be used intermittently. The intermittent operation can be accomplished by either timing the operating cycle of the tracking mechanism, to periodically re-aim the apparatus, or by introducing a sensitivity filter into the circuitry. The sensitivity filter would render the tracking circuitry inoperative until a threshold value of inequality was exceeded in the amount of light received at the photo cells. This would avoid the continuous operation of the tracking system while insuring that the apparatus would not exceed perfect aim position by more than a pre-determined amount. Thus, the tracking mechanism would be operative to maintain perfect aim within a tolerance.

It should also be pointed out that adequate safety features should be provided. The heat generated by the concentrated radiation is substantial. If the system malfunctioned and no safety features were present, the potential for damage to the system is significant. The low water switch 51 could be provided with an emergency shutoff to activate a safety circuit if very low water conditions are encountered, such as by a failure of pump 54. To prevent the concentrated radiation from burning up the surface of boiler 42, or from creating excessive steam pressure in the system, the focusing mechanism of concentrator 41 could be energized to intentionally de-focus the radiation until repairs are made. If this measure should prove to be ineffective, it would be very simple to intentionally de-track the aiming mechanism to aim collector 16 away from the sun. A third method, apparatus for which is not shown, is to employ a retractable sun screen. Such a screen could be positioned either to cover all or part of collector 16, or to cover concentrator 41. The sun screen would prevent the reflection and concentration of radiation.

To illustrate the size and capacity of a system embodying my invention, let me give the following example. If collector 16 is 180 feet in diameter, concentrator 41 is 50 feet in diameter and boiler 42 is 30 feet in diameter, the following calculations are valid. The usable area of collector 16 will be just under 23,500 square feet. For a solar intensity of 180 B.T.U. per square foot, and a system efficiency of 85%; approximately 1000 kilowatts per hour will be generated by each conversion tower 10 during sunlight hours. Allocating 1.25 acres per conversion tower 10, a concentration of over 500 towers might be produced in a square mile area.

The hydroelectric generation capacity is calculated as follows. Each acre-foot of water produces almost 72,000,000 foot-lbs for a 100 foot drop. This produces over 1000 kilowatt hours per acre of water with a 100 foot drop. If the effective area of upper reservoir 11 is 100 acres, with a 30 foot pull down, and a drop of 300 feet to hydroelectric generator 12, approximately 8,300,000 kilowatt hours could be generated.

It is is assumed, as a worse case example, that all solar produced energy is used to raise water to the reservoir and that all customer demanded energy was produced by hydroelectric regeneration, the following figures apply. Using a square mile area, 500 units would each produce 1000 kilowatts per hour during the sunlight hours. Thus, a total of 4,000,000 kilowatts would be stored. This would allow a system demand averaging over 150 megawatts for a 24-hour period, with peak potential of 500 megawatts during sunlight hours.

The figures given above are presented only to give an approximation of the capacity and effectiveness of this system. It is not intended, and should not be interpreted, as a limitation on the system or as a representation as to the operating efficiency and capacity of the system. The embodiment described was presented merely for purposes of illustration. It should be apparent that those skilled in the art could devise variations of the described embodiment that still embody the invention claimed.

I claim:
1. Apparatus for converting and storing solar energy comprising, in combination:
   a. collector means for collecting and reflecting incident solar radiation, said collector means including
      1. a generally circular framework having a planar configuration;
      2. a plurality of concentric annuli, each annulus having a plurality of modules, wherein each of said modules includes
         a shape substantially identical to that of every other module comprising said annulus,
         a generally planar rear surface,
         a reflective front surface having a concave shape with a point of focus,
   b. concentrator means for concentrating the reflected solar radiation, said concentrator means including
      1. a reflector located between said collector means and the solar radiation source for directing said solar radiation on a concentrated area, said reflector having a convex surface facing said collector means;
      2. a support for positioning said reflector in axial alignment with said collector means;
      3. a focuser for selectively moving said reflector along the axis of said collector means thereby selectively determining the location of the concentrated area on which said solar radiation is directed; and
      4. tracking means for maximizing the exposure of said collector means to normal incident solar radiation;
   c. converter and storage means for converting the concentrated solar radiation into electrical energy and potential energy and for storing the potential energy, said converter and storage means including
      1. a low elevation reservoir for retaining water,
      2. a high elevation reservoir for retaining water and for collecting surface water,
      3. a boiler positioned at the axis of said collector means for converting water into steam,
      4. a turbine powered by steam from said boiler,
      5. a condenser for converting steam leaving said turbine into water and for returning said converted water to said boiler,

6. a generator powered by said turbine for producing electrical energy, and
7. a pump powered by said turbine for producing and storing potential energy by transferring water from said low elevation reservoir to said high elevation reservoir; and
d. auxiliary conversion means for converting the stored potential energy into electrical energy, said auxiliary conversion means including a hydroelectric generator powered by water from said high elevation reservoir.

2. Apparatus for collecting incident solar radiation comprising, in combination:
a. a generally circular framework having a planar configuration;
b. a plurality of modules forming a plurality of concentric annuli, each of said modules including
 1. a shape substantially identical to that of every other module forming said annulus,
 2. a foamed plastic base having
  a generally planar rear surface,
  a front surface having a concave shape,
  opposing sides conforming generally to radii of said annulus,
  additional opposing sides conforming generally to circumferential segments of said annulus, the distance between the front and rear surfaces being substantially greater at the longer of said additional sides than at the shorter of said additional sides,
 3. a reflective metallic layer over the front surface of said base having a point of focus; and
c. means for locking each of said modules to said framework and thereby affixing said modules to said framework.

3. The apparatus of claim 1 wherein each of said modules further includes:
a locking notch, and
a duct originating at the rear surface and terminating at a surface of said module other than said front surface or said rear surface, said duct equalizing the air pressure differential between said front surface and said rear surface; and
a plurality of locking means for insertion into said locking notches for securing said modules to said framework.

4. The apparatus of claim 2 wherein each of said modules further includes:
a duct originating at said rear surfaces and terminating at the longer of said additional sides for equalizing the air pressure differential between said front surface and said rear surface, and
a locking notch.

* * * * *